(No Model.)
N. L. FRIZZELL.
TOBACCO HOISTING DEVICE.
No. 476,140. Patented May 31, 1892.
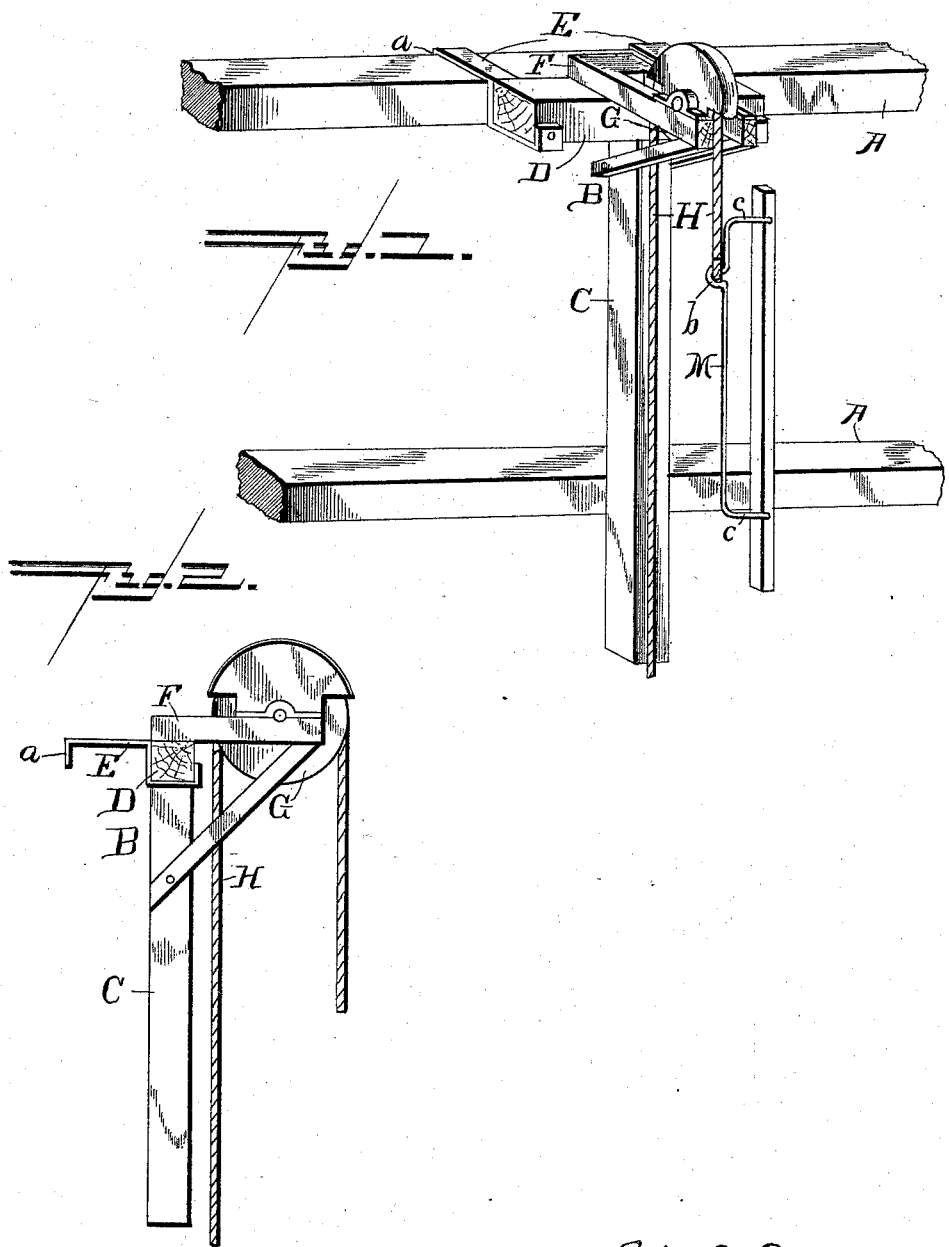

UNITED STATES PATENT OFFICE.

NATHEN L. FRIZZELL, OF FAIR DEALING, KENTUCKY.

TOBACCO-HOISTING DEVICE.

SPECIFICATION forming part of Letters Patent No. 476,140, dated May 31, 1892.

Application filed December 3, 1891. Serial No. 413,942. (No model.)

*To all whom it may concern:*

Be it known that I, NATHEN L. FRIZZELL, a citizen of the United States, residing at Fair Dealing, in the county of Marshall and State of Kentucky, have invented certain new and useful Improvements in Tobacco-Hoisting Devices; and I do hereby declare the following to be a full, clear, and exact description of the invention, such as will enable others skilled in the art to which it appertains to make and use the same.

My invention has relation to an improve hoisting device designed more especially for raising hanger-sticks upon the tier-poles in a tobacco-curing barn; and its novelty will be fully understood from the following description and claim when taken in conjunction with the accompanying drawings, in which—

Figure 1 is a perspective view of my improved device in an operative position, and Fig. 2 is a side elevation of the device.

Referring by letter to the said drawings, A indicates a series of tier-poles in a tobacco-curing barn, and B indicates the main frame of my improved device, which comprises the depending bar C and the cross-head D, fixedly connected to the upper end of said bar. Fixedly connected to the cross-head D and extending laterally therefrom are hanger-arms E, which are provided at their inner ends with depending angular portions *a*, and are designed to be placed over the top tier-pole of a series to support the main frame, the depending bar C bearing against the tier-poles and serving to hold the frame in its upright position. Fixedly connected to the cross-head D and extending laterally therefrom in an opposite direction to the hanger-arms E is a hanger-beam F, which is braced, as shown, and has its outer end slotted to receive the pulley G, which is mounted on said beam and is preferably hooded, as illustrated. Taking over the pulley G is the hoisting-cable H, which may be of any ordinary or any approved character, and has one of its ends connected to a loop or eye *b*, formed at an intermediate point in the length of an engaging hook M, which is provided at its ends with angular portions *c*, which merge in turn into angular points designed and adapted to take into the stick to be hoisted.

In operation the hanger-arms E are hooked over the top tier-pole of a series and serve, in conjunction with the depending bar C, which bears against the poles, to hold the frame in position. After a sufficient number of sticks have been raised for the top tier-poles the main frame is disconnected therefrom and is lowered to the next succeeding pole, and so on down until the series of poles have been covered with sticks.

Having thus described my invention, what I claim, and desire to secure by Letters Patent, is—

The improved tobacco-hoisting device, substantially as described, comprising the cross-head, the bar connected to and depending from said cross-head, the hanger-arms E, fixedly connected to and extending laterally from the cross-head and adapted to engage a tier-pole, the hanger-beam connected to the cross-head and extending laterally therefrom in a direction opposite to the arms E, a pulley journaled in said hanger-beam, a hoisting-cable taking over said pulley, and a hook connected to one end of said cable and adapted to engage a hanger-stick, substantially as and for the purpose set forth.

In testimony whereof I affix my signature in presence of two witnesses.

NATHEN L. FRIZZELL.

Witnesses:
JAS. K. WILSON,
R. H. FRIZZELL.